(12) United States Patent
Yaguchi

(10) Patent No.: US 7,379,313 B2
(45) Date of Patent: May 27, 2008

(54) VOLTAGE CONVERSION DEVICE

(75) Inventor: Hideaki Yaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/562,930

(22) PCT Filed: Feb. 9, 2005

(86) PCT No.: PCT/JP2005/002382

§ 371 (c)(1),
(2), (4) Date: Dec. 30, 2005

(87) PCT Pub. No.: WO2005/081387

PCT Pub. Date: Sep. 1, 2005

(65) Prior Publication Data

US 2007/0058404 A1    Mar. 15, 2007

(30) Foreign Application Priority Data

Feb. 19, 2004   (JP) .............................. 2004-043296

(51) Int. Cl.
*H02M 7/44* (2006.01)
*H02M 5/458* (2006.01)
(52) U.S. Cl. .......................................... 363/98; 363/37
(58) Field of Classification Search ................. 363/34, 363/37, 65, 71, 98, 131, 132
See application file for complete search history.

(56) References Cited

U.S. PATENT DOCUMENTS

| | | | |
|---|---|---|---|
| 4,851,751 A | 7/1989 | Gipson | |
| 5,710,699 A | 1/1998 | King et al. | |
| 6,031,359 A | 2/2000 | Michelsen et al. | |
| 6,204,627 B1* | 3/2001 | Watanabe et al. ........... | 318/729 |
| 6,297,616 B1 | 10/2001 | Kubo et al. | |
| 6,486,632 B2* | 11/2002 | Okushima et al. .......... | 318/599 |
| 6,657,417 B1* | 12/2003 | Hwang ....................... | 323/222 |
| 6,696,818 B2 | 2/2004 | Arai et al. | |
| 2001/0053950 A1 | 12/2001 | Hasegawa et al. | |
| 2003/0076079 A1 | 4/2003 | Alcantar et al. | |
| 2004/0165868 A1 | 8/2004 | Sato et al. | |
| 2005/0097701 A1 | 5/2005 | Kushida et al. | |

FOREIGN PATENT DOCUMENTS

| | | |
|---|---|---|
| DE | 41 14 617 C1 | 10/1992 |
| EP | 1 414 145 A1 | 4/2004 |
| JP | A 2001-275367 | 10/2001 |
| JP | A 2003-309997 | 10/2003 |
| WO | WO 03/015254 A1 | 2/2003 |

* cited by examiner

*Primary Examiner*—Gary L Laxton
(74) *Attorney, Agent, or Firm*—Oliff & Berridge, PLC

(57) ABSTRACT

A control device (30) calculates an upper limit value of a duty ratio (DR_Ulim) according to a voltage (Vm) from a voltage sensor (13) and a threshold voltage (OVb) when an overvoltage is determined to have been applied to a battery (B), and determines a duty ratio (DR) for providing switching control to NPN transistors (Q1, Q2) in a range lower than the calculated upper limit value of the duty ratio (DR_Ulim). The control device (30) uses the determined duty ratio (DR) to provide switching control to the NPN transistors (Q1, Q2). Then, an up-convener (12) converts a direct current voltage (Vb) from the battery (B) into the output voltage (Vm) such that an overvoltage is not applied to the battery (B).

5 Claims, 6 Drawing Sheets

VOLTAGE CONVERSION DEVICE

TECHNICAL FIELD

The present invention relates to a voltage conversion device, and more particularly, to a voltage conversion device converting a voltage without applying an overvoltage to a power supply outputting a power supply voltage.

BACKGROUND ART

A conventional voltage conversion device includes an up-converter and a control device. The control device receives an output voltage of the up-converter, a torque control value to be output by an alternating-current (AC) motor as a load, and a rotation number of the AC motor.

The control device calculates a target voltage of the up-converter in accordance with the torque control value and the motor rotation number, and further calculates an error between the calculated target voltage and the output voltage of the up-converter. The control device then adjusts PI control gain (proportional gain and integral gain) according to the calculated error, and uses the adjusted PI control gain to provide feedback control to the up-converter.

Under the feedback control by the control device, the up-converter converts a direct-current (DC) voltage from a DC power supply into the output voltage such that the output voltage attains the target voltage (Japanese Patent Laying-Open No. 2003-309997).

In this manner, the conventional voltage conversion device adjusts the PI control gain in accordance with the error between the target voltage and the output voltage converted from the DC voltage, and uses the adjusted PI control gain to convert the DC voltage from the DC power supply into the output voltage such that the output voltage attains the target voltage.

In the conventional voltage conversion device, however, when the output voltage deviates from the target voltage and a duty ratio is considerably changed to allow the deviated output voltage to reach the target voltage, electric power returning back to the power supply side is increased and an overvoltage is applied to the power supply.

An object of the present invention is to provide a voltage conversion device converting a voltage without applying an overvoltage to a power supply.

DISCLOSURE OF THE INVENTION

According to the present invention, the voltage conversion device includes a voltage converter and a control device. The voltage converter converts a power supply voltage from a power supply into an output voltage such that the output voltage attains a target voltage, through a switching operation between a first switching element as an upper arm and a second switching element as a lower arm. The control device provides switching control to the first and the second switching elements using a duty ratio in a range lower than an upper limit value of the duty ratio when an overvoltage is applied to the power supply.

Preferably, the control device includes duty ratio calculating means and switching control means. The duty ratio calculating means calculates the upper limit value of the duty ratio in accordance with the output voltage and a threshold voltage which is a reference value for determining that the overvoltage has been applied to the power supply. The switching control means provides switching control to the first and the second switching elements using the duty ratio in the range lower than the calculated upper limit value of the duty ratio.

Preferably, the output voltage is supplied to an inverter driving a motor.

Preferably, the output voltage is supplied to a plurality of inverters provided corresponding to a plurality of motors and connected in parallel with each other.

Preferably, the power supply voltage is obtained from a direct current battery.

In the voltage conversion device according to the present invention, the first and the second switching elements are subjected to switching control using the duty ratio lower than the upper limit value of the duty ratio when the overvoltage is applied to the power supply, to convert the power supply voltage from the power supply into the output voltage such that the output voltage attains the target voltage.

Therefore, according to the present invention, application of an overvoltage to the power supply can be prevented.

The foregoing and other objects, features, aspects and advantages of the present invention will become more apparent from the following detailed description of the present invention when taken in conjunction with the accompanying drawings.

BEST MODES FOR CARRYING OUT THE INVENTION

Figure 1:
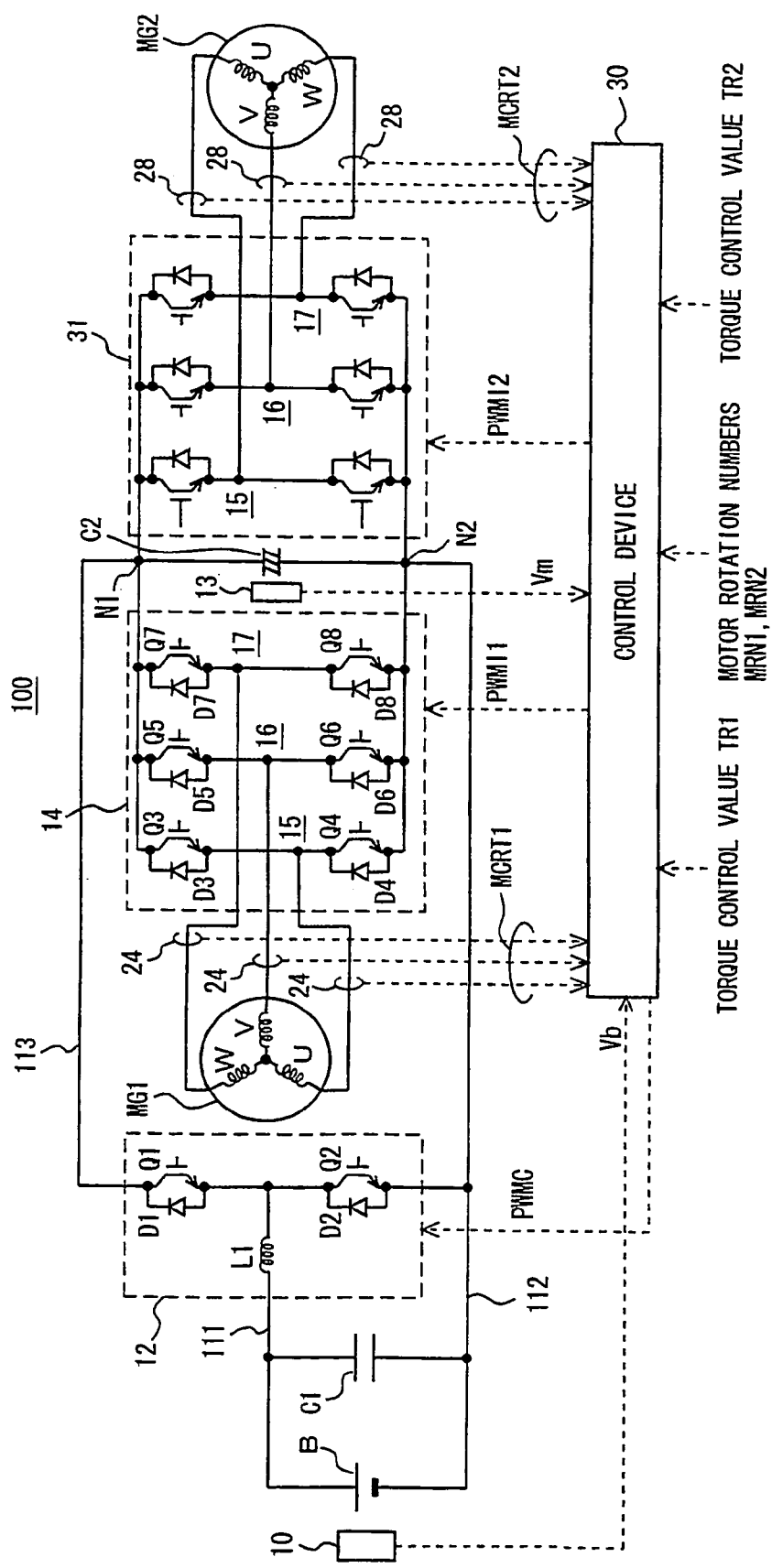
FIG. 1 is a schematic diagram of a motor driver including a voltage conversion device in accordance with an embodiment of the present invention.

An embodiment of the present invention will be described in detail with reference to the drawings, in which identical or corresponding parts will be designated by the same reference numerals, and the description thereof will not be repeated.

FIG. 1 is a schematic diagram of a motor driver including a voltage conversion device in accordance with an embodiment of the present invention. Referring to FIG. 1, a motor driver 100 including the voltage conversion device in accordance with the embodiment of the present invention includes a battery B, capacitors C1 and C2, voltage sensors 10 and 13, an up-converter 12, inverters 14 and 31, current sensors 24 and 28, and a control device 30.

Motor generators MG1 and MG2 are drive motors each generating a torque for driving a drive wheel of a hybrid vehicle or an electric vehicle. Alternately, motor generators MG1 and MG2 may be incorporated into a hybrid vehicle so as to have a function of a generator driven by an engine, and to operate as an electric motor for the engine to provide engine starting, for example.

Battery B is connected between a power supply line 111 and a negative bus 112 of inverters 14 and 31. Capacitor C1 is connected between power supply line 111 and negative bus 112, in parallel with battery B. Capacitor C2 is connected between a positive bus 113 of inverters 14 and 31 and negative bus 112.

Up-converter 12 includes a reactor L1, NPN (negative-positive-negative) transistors Q1 and Q2, and diodes D1 and D2. One end of reactor L1 is connected to power supply line 111 of battery B, and the other end is connected to an intermediate point between NPN transistor Q1 and NPN transistor Q2, that is, between the emitter of NPN transistor Q1 and the collector of NPN transistor Q2. NPN transistors Q1 and Q2 are connected in series between positive bus 113 and negative bus 112. The collector of NPN transistor Q1 is connected to positive bus 113, and the emitter of NPN transistor Q2 is connected to negative bus 112. Between the collector and the emitter of each of NPN transistors Q1 and Q2, diodes D1 and D2 each passing a current from the emitter side to the collector side are connected, respectively.

Inverters 14 and 31 are connected in parallel between a node N1 and a node N2.

Inverter 14 includes a U-phase arm 15, a V-phase arm 16, and a W-phase arm 17. U-phase arm 15, V-phase arm 16, and W-phase arm 17 are connected in parallel between positive bus 113 and negative bus 112.

U-phase arm 15 includes NPN transistors Q3 and Q4 connected in series, V-phase arm 16 includes NPN transistors Q5 and Q6 connected in series, and W-phase arm 17 includes NPN transistors Q7 and Q8 connected in series. Between the collector and the emitter of each of NPN transistors Q3 to Q8, diodes D3 to D8 each passing a current from the emitter side to the collector side are connected, respectively.

An intermediate point of each phase arm is connected to each phase end of each phase coil of motor generator MG1. More specifically, motor generator MG1 is a three-phase permanent magnet motor, and configured such that one end of each of three coils in the U phase, the V phase, and the W phase is connected to a middle point in common, and the other end of the U-phase coil is connected to an intermediate point between NPN transistors Q3 and Q4, the other end of the V-phase coil is connected to an intermediate point between NPN transistors Q5 and Q6, and the other end of the W-phase coil is connected to an intermediate point between NPN transistors Q7 and Q8.

Inverter 31 has the same configuration as that of inverter 14. An intermediate point of each phase arm of inverter 31 is connected to each phase end of each phase coil of motor generator MG2. More specifically, motor generator MG2 is also a three-phase permanent magnet motor as is motor generator MG1, and configured such that one end of each of three coils in the U phase, the V phase, and the W phase is connected to a middle point in common, and the other end of the U-phase coil is connected to an intermediate point between NPN transistors Q3 and Q4 of inverter 31, the other end of the V-phase coil is connected to an intermediate point between NPN transistors Q5 and Q6 of inverter 31, and the other end of the W-phase coil is connected to an intermediate point between NPN transistors Q7 and QS of inverter 31.

Battery B is a DC battery including a secondary battery using such as nickel hydride, lithium ion, or the like. Voltage sensor 10 detects a DC voltage Vb output from battery B, and outputs the detected DC voltage Vb to control device 30. Capacitor C1 smoothes the DC voltage output from battery B, and supplies the smoothed DC voltage to up-converter 12.

Up-converter 12 up-converts the DC voltage supplied from capacitor C1 for input to capacitor C2. More specifically, upon receiving a signal PWMC from control device 30, up-converter 12 up-converts the DC voltage according to a period for which NPN transistor Q2 is turned ON by signal PWMC, for supply to capacitor C2. In this case, NPN transistor Q1 is turned OFF by signal PWMC.

Further, up-converter 12 down-converts a DC voltage supplied from inverter 14 (or 31) via capacitor C2, according to signal PWMC from control device 30, to charge battery B.

Capacitor C2 smoothes the DC voltage up-converted by up-converter 12, and supplies the smoothed DC voltage to inverters 14 and 31 via nodes N1 and N2. In this manner, capacitor C2 receives the DC voltage up-converted by up-converter 12, and smoothes the received DC voltage for supply to inverters 14 and 31.

Voltage sensor 13 detects a voltage Vm across capacitor C2 (i.e., a voltage equivalent to the voltage input to inverters 14 and 31: the same is true in the following), and outputs the detected voltage Vm to control device 30.

When the DC voltage is supplied from up-converter 12 to inverter 14 via nodes N1 and N2 and capacitor C2, inverter 14 converts the DC voltage into an AC voltage in accordance with a signal PWMI1 from control device 30, to drive motor generator MG1. Thus, motor generator MG1 is driven to generate a torque designated by a torque control value TR1. Further, when regenerative braking is performed in a hybrid vehicle or an electric vehicle equipped with motor driver 100, inverter 14 converts an AC voltage generated by motor generator MG1 into a DC voltage in accordance with signal PWMI1 from control device 30, and supplies the converted DC voltage to up-converter 12 via capacitor C2 and nodes N1 and N2.

When the DC voltage is supplied from up-converter 12 to inverter 31 via nodes N1 and N2 and capacitor C2, inverter 31 converts the DC voltage into an AC voltage in accordance with a signal PWMI2 from control device 30, to drive motor generator MG2. Thus, motor generator MG2 is driven to generate a torque designated by a torque control value TR2. Further, when regenerative braking is performed in a hybrid vehicle or an electric vehicle equipped with motor driver 100, inverter 31 converts an AC voltage generated by motor generator MG2 into a DC voltage in accordance with signal PWMI2 from control device 30, and supplies the converted DC voltage to up-converter 12 via capacitor C2 and nodes N1 and N2.

It is to be noted that "regenerative braking" described herein includes braking involving regenerative power generation when a driver driving a hybrid vehicle or an electric vehicle uses a foot brake, as well as slowing down (or stopping acceleration of) the vehicle while performing regenerative power generation when the driver does not use a foot brake but releases an accelerator pedal while driving the vehicle.

Current sensor 24 detects a motor current MCRT1 flowing into motor generator MG1, and outputs the detected motor current MCRT1 to control device 30. Current sensor 28 detects a motor current MCRT2 flowing into motor generator MG2, and outputs the detected motor current MCRT2 to control device 30.

Control device 30 receives: torque control values TR1, TR2 and motor rotation numbers MRN1, MRN2 from an external ECU (Electrical Control Unit); DC voltage Vb from voltage sensor 10; output voltage Vm from voltage sensor 13; motor current MCRT1 from current sensor 24; and motor current MCRT2 from current sensor 28. Control sensor 30 generates signal PWMI1 for providing switching-control to NPN transistors Q3 to Q8 of inverter 14 when inverter 14 drives motor generator MG1 in a manner which will be described later, in accordance with output voltage Vm, motor current MCRT1, and torque control value TR1, and outputs the generated signal PWMI1 to inverter 14.

Further, control sensor 30 generates signal PWMI2 for providing switching control to NPN transistors Q3 to Q8 of inverter 31 when inverter 31 drives motor generator MG2 in a manner which will be described later, in accordance with output voltage Vm, motor current MCRT2, and torque control value TR2, and outputs the generated signal PWMI2 to inverter 31.

Furthermore, when inverter 14 (or 31) drives motor generator MG1 (or MG2), control sensor 30 generates signal PWMC for providing switching control to NPN transistors Q1 and Q2 of up-converter 12 in a manner which will be described later, in accordance with DC voltage Vb, output voltage Vm, torque control value TR1 (or TR2), and motor rotation number MRN1 (or MNR2), and outputs the generated signal PWMC to up-converter 12. Signal PWMC is a signal for providing switching control to NPN transistors Q1 and Q2 such that an overvoltage is not applied to battery B.

Figure 2:
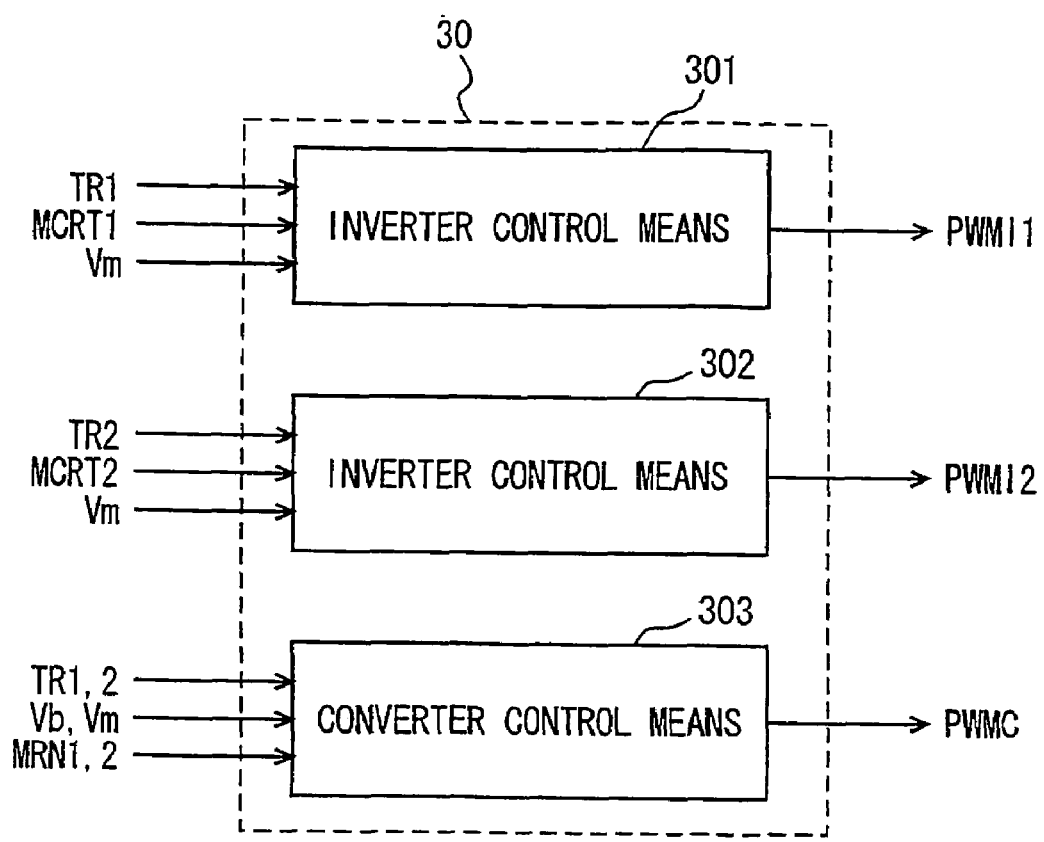
FIG. 2 is a functional block diagram of a control device shown in FIG. 1.

FIG. 2 is a functional block diagram of control device 30 shown in FIG. 1. Referring to FIG. 2, control device 30 includes inverter control means 301 and 302, and converter control means 303.

Inverter control means 301 receives torque control value TR1 from the external ECU, motor current MCRT1 from current sensor 24, and voltage Vm from voltage sensor 13. Then, inverter control means 301 generates signal PWMI1 in a manner which will be described later, in accordance with torque control value TR1, motor current MCRT1, and voltage Vm, for output to inverter 14.

Inverter control means 302 receives torque control value TR2 from the external ECU, motor current MCRT2 from current sensor 28, and voltage Vm from voltage sensor 13. Then, inverter control means 302 generates signal PWM in a manner which will be described later, in accordance with torque control value TR2, motor current MCRT2, and voltage Vm, for output to inverter 31.

Converter control means 303 receives torque control values TR1, TR2 and motor rotation numbers MRN1, MRN2 from the external ECU, DC voltage Vb from voltage sensor 10, and voltage Vm from voltage sensor 13. Converter control means 303 holds a threshold voltage OVb, which is a reference value to determine that an overvoltage has been applied to battery B. In accordance with the held threshold voltage OVb and voltage Vm received from voltage sensor 13, converter control means 303 calculates an upper limit value of a duty ratio DR_Ulim in the switching control for NPN transistors Q1 and Q2 when an overvoltage (i.e., threshold voltage OVb) is applied to battery B, in a manner which will be described later. Then, converter control means 303 generates signal PWMC in a range lower than the calculated upper limit value of the duty ratio DR_Ulim in a manner which will be described later, in accordance with torque control value TR1 (or TR2), motor rotation number MRN1 (or MRN2), DC voltage Vb, and voltage Vm, for output to up-converter 12. It is to be noted that threshold voltage OVb is set for example at the minimum value of the voltage applied to battery B which is determined as an overvoltage.

Figure 3:
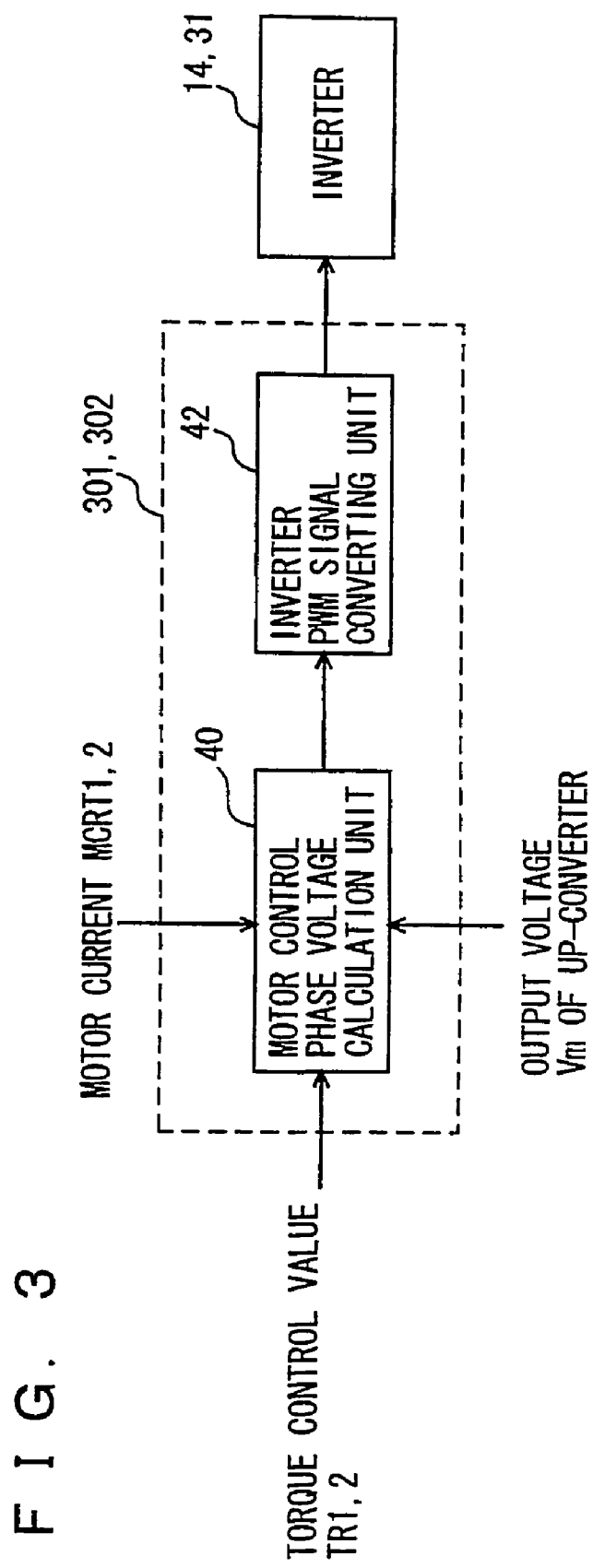
FIG. 3 is a functional block diagram of inverter control means shown in FIG. 2.

FIG. 3 is a functional block diagram of inverter control means 301 and 302 shown in FIG. 2. Referring to FIG. 3, each of inverter control means 301 and 302 includes a motor control phase voltage calculation unit 40 and an inverter PWM signal converting unit 42.

Motor control phase voltage calculation unit 40 receives: torque control values TR1 and TR2 from the external ECU; output voltage Vm of up-converter 12, that is, the voltage input to inverters 14 and 31, from voltage sensor 13; motor current MCRT1 flowing into each phase of motor generator MG1 from current sensor 24; and motor current MCRT2 flowing into each phase of motor generator MG2 from current sensor 28. Then, motor control phase voltage calculation unit 40 calculates a voltage to be applied to each phase coil of motor generator MG1 (or motor generator MG2) in accordance with output voltage Vm, torque control value TR1 (or TR2), and motor current MCRT1 (or MCRT2), and outputs the resultant calculation to inverter PWM signal converting unit 42.

Inverter PWM signal converting unit 42 generates signal PWMI1 (or signal PWMI2) actually turning ON/OFF each of NPN transistors Q3 to Q8 of inverter 14 (or inverter 31) in accordance with the resultant calculation received from motor control phase voltage calculation unit 40, and outputs the generated signal PWMI1 (or signal PWMI2) to each of NPN transistors Q3 to QS of inverter 14 (or inverter 31).

Thus, each of NPN transistors Q3 to QS is subjected to switching control to control the current flowing into each phase of motor generator MG1 (or motor generator MG2) such that motor generator MG1 (or motor generator MG2) outputs a controlled torque. In this manner, a motor driving current is controlled, and a motor torque according to torque control value TR1 (or TR2) is output.

Whether inverter 14 is driven by signal PWMI1 in a power running mode or in a regenerative mode is determined by motor rotation number MRN1 and torque control value TR1. More specifically, in rectangular coordinates having a lateral axis representing a motor rotation number and a vertical axis representing a torque control value, when the relation between motor rotation number MRN1 and torque control value TR1 is present in the first or the second quadrant, motor generator MG1 is in the power running mode, and when the relation between motor rotation number MRN1 and torque control value TR1 is present in the third or the fourth quadrant, motor generator MG1 is in the regenerative mode. Accordingly, when motor control phase voltage calculation unit 40 receives from the external ECU motor rotation number MRN1 and torque control value TR1 present in the first or the second quadrant, inverter PWM signal converting unit 42 generates signal PWMI1 for driving inverter 14 in the power running mode, and when motor control phase voltage calculation unit 40 receives from the external ECU motor rotation number MRN1 and torque control value TR1 present in the third or the fourth quadrant, inverter PWM signal converting unit 42 generates signal PWMI1 for driving inverter 14 in the regenerative mode.

The same is true with regard to whether inverter 31 is driven by signal PWMI2 in the power running mode or in the regenerative mode.

Figure 4:
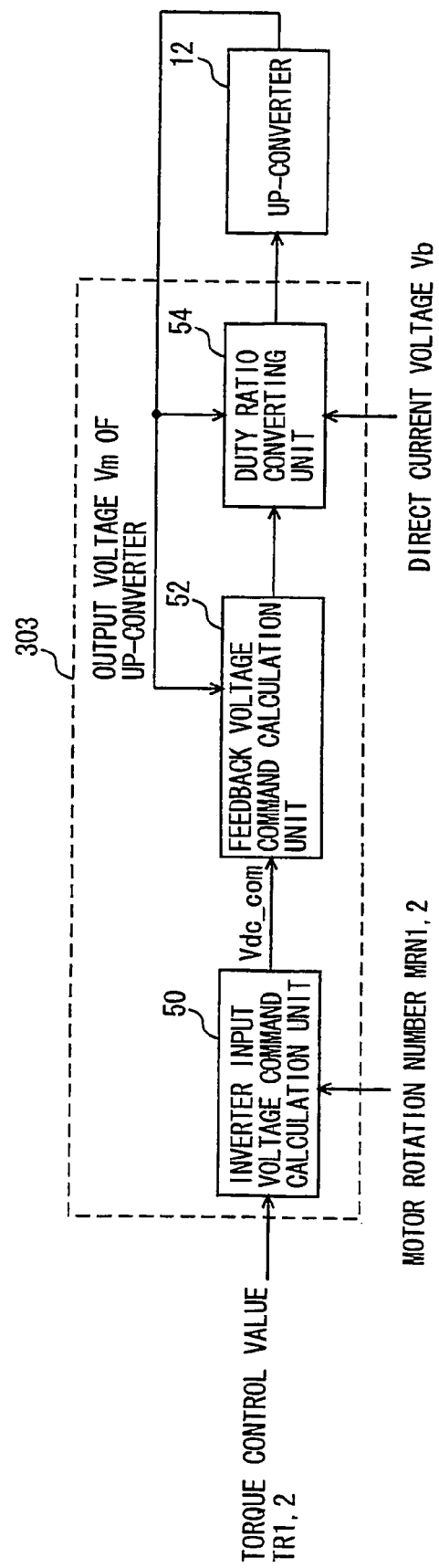
FIG. 4 is a functional block diagram of converter control means shown in FIG. 2.

FIG. 4 is a functional block diagram of converter control means 303 shown in FIG. 2. Referring to FIG. 4, converter control means 303 includes an inverter input voltage command calculation unit 50, a feedback voltage command calculation unit 52, and a duty ratio converting unit 54.

Inverter input voltage command calculation unit 50 receives torque control values TR1, TR2 and motor rotation numbers MRN1, MRN2 from the external ECU. Then, inverter input voltage command calculation unit 50 calculates an optimal value (target value) of the voltage input to the inverter, that is, a voltage command Vdc_com, in accordance with torque control value TR1 (or TR2) and motor rotation number MRN1 (or MRN2), and outputs the calculated voltage command Vdc_com to feedback voltage command calculation unit 52.

Feedback voltage command calculation unit 52 receives output voltage Vm of up-converter 12 from voltage sensor 13, and voltage command Vdc_com (corresponding to a target voltage of output voltage Vm: the same is true in the following) from inverter input voltage command calculation unit 50. Then, feedback voltage command calculation unit 52 calculates a feedback voltage command Vdc_com_fb for setting output voltage Vm to voltage command Vdc_com, in accordance with output voltage Vm and voltage command Vdc_com, and outputs the calculated feedback voltage command Vdc_com_fb to duty ratio converting unit 54.

Duty ratio converting unit 54 holds threshold voltage OVb, and receives DC voltage Vb from voltage sensor 10 and output voltage Vm from voltage sensor 13. Duty ratio converting unit 54 calculates the upper limit value of the duty ratio DR_Ulim in accordance with threshold OVb and output voltage Vm, using the following equation:

$$DR\_Ulim = OVb/Vm \ldots \quad (1)$$

It is to be noted that, in the present invention, the "duty ratio" refers to a ratio between an ON period T1on of NPN transistor Q1, which is an upper arm of up-converter 12, and an ON period T2on of NPN transistor Q2, which is a lower arm of up-converter 12 (=T1on/(T1on+T2on)).

From equation (1), the upper limit value of the duty ratio DR_Ulim is determined according to output voltage Vm actually output from up-converter 12.

Upon calculating the upper limit value of the duty ratio DR_Ulim, duty ratio converting unit 54 calculates a duty ratio DR for setting output voltage Vm to feedback voltage command Vdc_com_fb in a range lower than the calculated upper limit value of the duty ratio DR_Ulim, in accordance with DC voltage Vb, output voltage Vm, and feedback voltage command Vdc_com_fb.

Figure 5:
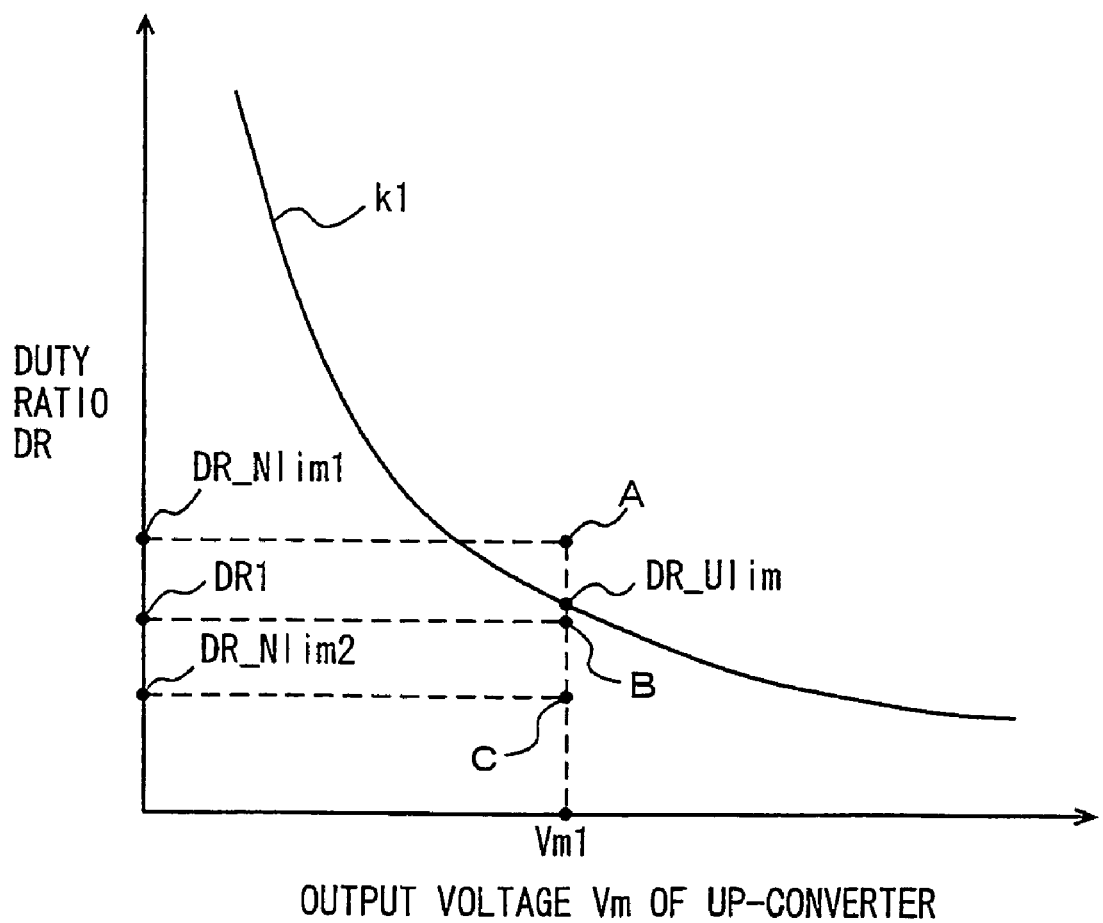
FIG. 5 is a diagram showing relation between a duty ratio DR and an output voltage Vm of an up-converter.

FIG. 5 is a diagram showing relation between duty ratio DR and output voltage Vm of up-converter 12. Referring to FIG. 5, a curve k1 represents the upper limit value of the duty ratio DR_Ulim calculated by the above equation (1). The area not lower than curve k1 represents a duty ratio when an overvoltage is applied to battery B, and the area lower than curve k1 represents a duty ratio when an overvoltage is not applied to battery B.

In the area lower than curve k1, duty ratio converting unit 54 calculates duty ratio DR for setting output voltage Vm to feedback voltage command Vdc_com_fb, in accordance with DC voltage Vb, output voltage Vm, and feedback voltage command Vdc_com_fb.

This means that, when a duty ratio DR_Nlim1, calculated to set output voltage Vm to feedback voltage command Vdc_com_fb in accordance with DC voltage Vb, an output voltage Vm1, and feedback voltage command Vdc_com_fb without limitation of the upper limit value of the duty ratio DR_Ulim, is not lower than the upper limit value of the duty ratio DR_Ulim, duty ratio converting unit 54 determines a duty ratio DR1 lower than the upper limit value of the duty ratio DR_Ulim as duty ratio DR for providing switching control to NPN transistors Q1 and Q2, and when a duty ratio DR_Nlim2 calculated without limitation is lower than the upper limit value of the duty ratio DR_Ulim, duty ratio converting unit 54 determines the calculated duty ratio DR_Nlim2 as duty ratio DR for providing switching control to NPN transistors Q1 and Q2.

More specifically, when the relation between the calculated duty ratio DR_Nlim1 and output voltage Vm1 is present at a point A upper than curve k1, duty ratio DR1 lower than the upper limit value of the duty ratio DR_Ulim is determined as duty ratio DR for providing switching control to NPN transistors Q1 and Q2 such that the relation between duty ratio DR and output voltage Vm is present at a point B lower than curve k1, and when the relation between the calculated duty ratio DR_Nlim2 and output voltage Vm1 is present at a point C lower than curve k1, the calculated duty ratio DR_Nlim2 is determined as duty ratio DR for providing switching control to NPN transistors Q1 and Q2.

Duty ratio converting unit 54 determines duty ratio DR for providing switching control to NPN transistors Q1 and Q2 in the area lower than curve k1, no matter how DC voltage Vb, output voltage Vm, and feedback voltage command Vdc_com_fb vary.

When duty ratio DR1 lower than the upper limit value of the duty ratio DR_Ulim is determined as duty ratio DR for providing switching control to NPN transistors Q1 and Q2 resulting from the fact that duty ratio DR_Nlim1 calculated without limitation is not lower than the upper limit value of the duty ratio DR_Ulim, duty ratio DR1 is determined in various manners.

More specifically, duty ratio DR1 may be determined at a value as close as possible to the upper limit value of the duty ratio DR_Ulim in the range lower than the upper limit value of the duty ratio DR_Ulim, and may be determined in the range lower than the upper limit value of the duty ratio DR_Ulim according to a difference ΔDR between duty ratio DR_Nlim1 and the upper limit value of the duty ratio DR_Ulim. In the latter case, when difference ΔDR is relatively large, duty ratio DR1 may be determined in the range lower than the upper limit value of the duty ratio DR_Ulim such that the difference from the upper limit value of the duty ratio DR_Ulim is relatively small, and when difference ΔDR is relatively small, duty ratio DR1 may be determined in the range lower than the upper limit value of the duty ratio DR_Ulim such that the difference from the upper limit value of the duty ratio DR_Ulim is relatively large.

After calculating duty ratio DR for providing switching control to NPN transistors Q1 and Q2, duty ratio converting unit 54 generates signal PWMC for turning ON/OFF NPN transistors Q1 and Q2 of up-converter 12 in accordance with the calculated duty ratio DR. Then, duty ratio converting unit 54 outputs the generated signal PWMC to NPN transistors Q1 and Q2 of up-converter 12.

Thus, NPN transistors Q1 and Q2 of up-converter 12 are subjected to switching control such that an overvoltage is not applied to battery B, and up-converter 12 converts DC voltage Vb into output voltage Vm such that output voltage Vm attains a target voltage (voltage command Vdc_com). Therefore, application of an overvoltage to battery B can be prevented.

It is to be noted that, since power accumulation in reactor L1 is increased by raising an on-duty ratio of NPN transistor Q2, the lower transistor in up-converter 12, a higher-voltage output can be achieved. On the contrary, the voltage of the positive bus is decreased by raising an on-duty ratio of upper NPN transistor Q1. Thus, the voltage of the positive bus can be controlled to be any voltage not lower than the output voltage of battery B. by controlling the duty ratio between NPN transistors Q1 and Q2.

In motor driver 100, voltage Vm across capacitor C2 may greatly vary depending on operating conditions of motor generators MG1 and MG2. More specifically, voltage Vm significantly falls when power consumption in motor generator MG2 increases rapidly, and voltage Vm significantly rises when power generation in motor generator MG1 increases rapidly.

Since output voltage Vm significantly deviates from the target voltage (voltage command Vdc_com) in such a situation, converter control means 303 significantly changes duty ratio DR such that output voltage Vm attains the target voltage to provide switching control to NPN transistors Q1 and Q2.

In this case, unless duty ratio DR for providing switching control to NPN transistors Q1 and Q2 is limited, an overvoltage is applied to battery B. More specifically, when output voltage Vm rises much greater than the target voltage, converter control means 303 raises duty ratio DR to decrease output voltage Vm down to the target voltage, to provide switching control to NPN transistors Q1 and Q2. Then, period T1on for which NPN transistor Q1 is turned ON is extended, and a higher ratio of the current flows from the side of inverters 14 and 31 to the side of battery B via up-converter 12. As a result, an overvoltage is applied to battery B.

Further, when output voltage Vm falls much less than the target voltage, converter control means 303 reduces duty ratio DR (that is, extends ON period T2on of NPN transistor Q2 as the lower arm) to increase output voltage Vm up to the target voltage, to provide switching control to NPN transistors Q1 and Q2. Then, large electric energy is accumulated in reactor L1, output voltage Vm rises higher than the target voltage, and converter control means 303 raises duty ratio DR to provide switching control to NPN transistors Q1 and Q2. As a result, an overvoltage is applied to battery B as described above.

In this manner, an overvoltage is applied to battery B when output voltage Vm varies (decreases/increases) from the target voltage.

In the present invention, however, since converter control means 303 determines duty ratio DR in the range lower than the upper limit value of the duty ratio DR_Ulim and uses the determined duty ratio DR to provide switching control to NPN transistors Q1 and Q2 as described above, no overvoltage is applied to battery B even when output voltage Vm varies from the target voltage.

It is to be noted that the operation in converter control means 303 is actually performed by a CPU (Central Processing Unit). The CPU reads a program stored in a ROM (Read Only Memory), performs the read program to determine duty ratio DR in the range lower than the upper limit value of the duty ratio DR_Ulim, and uses the determined duty ratio DR to provide switching control to NPN transistors Q1 and Q2.

Figure 6:
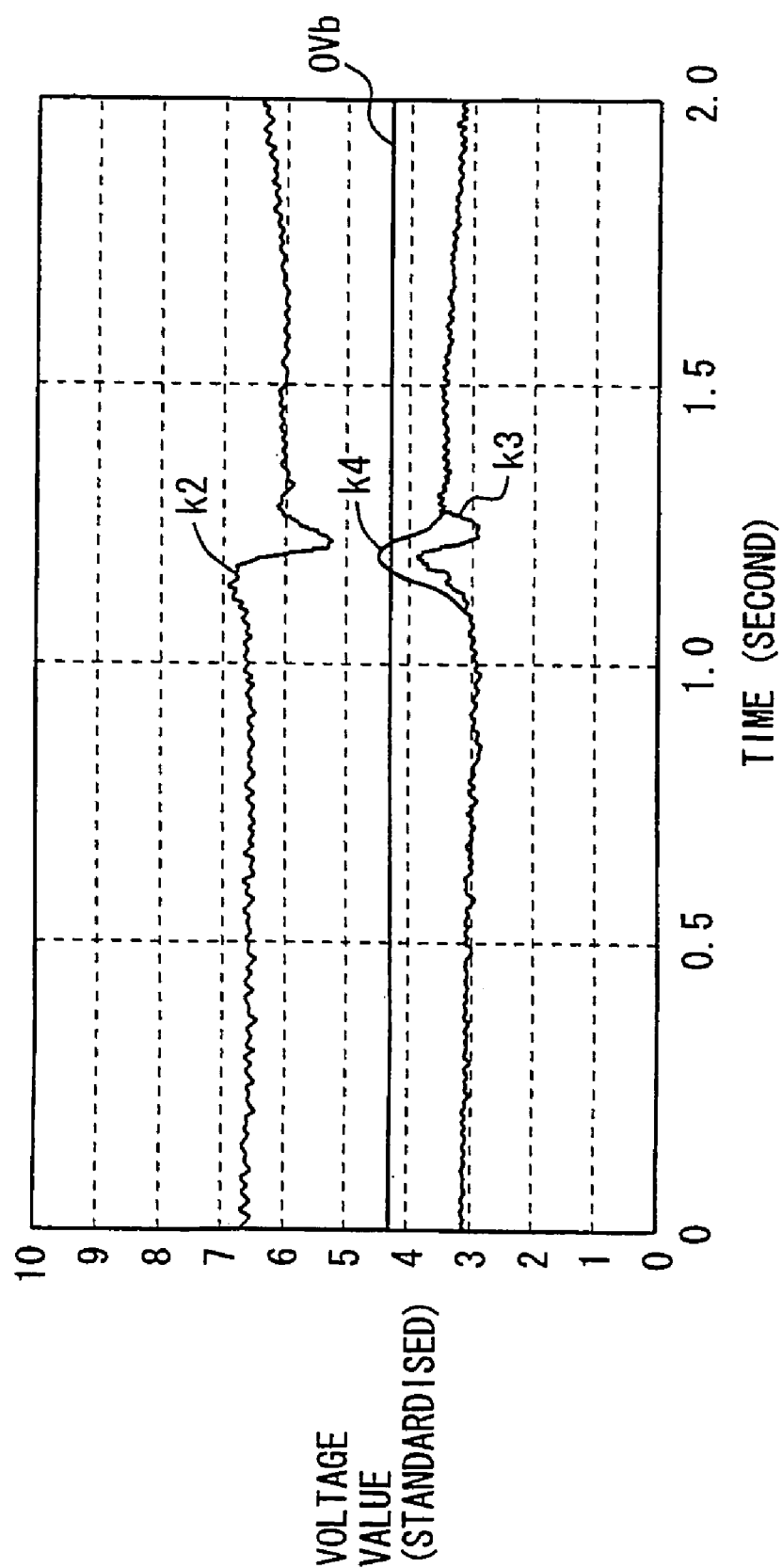
FIG. 6 is a timing chart of voltage values.

FIG. 6 is a timing chart of voltage values. In FIG. 6, the vertical axis represents a standardized voltage value, and the lateral axis represents time. A curve ks represents output voltage Vm, a curve k3 represents DC voltage Vb in the case where the present invention is applied, and a curve k4 represents DC voltage Vb in the case where the present invention is not applied.

Referring to FIG. 6, when output voltage Vm moves up and down after a lapse of 1.0 second, DC voltage Vb of battery B in the case where the present invention is applied moves up and down along with the fluctuation of output voltage Vm but does not reach threshold voltage OVb (see curve k3), and thus no overvoltage is applied to battery B.

On the contrary, in the case where the present invention is not applied, DC voltage Vb of battery B significantly rises along with the fluctuation of output voltage Vm, reaching threshold voltage OVb. As a result, an overvoltage is applied to battery B.

Therefore, application of an overvoltage to battery B can be prevented by applying the present invention.

It is to be noted that the level of threshold voltage OVb is determined in consideration of the protection of battery B and the protection of auxiliary equipment connected between battery B and up-converter 12 and driven by directly receiving DC voltage Vb from battery B.

Referring to FIG. 1 again, an overall operation in motor driver 100 will be described. When the overall operation is started, voltage sensor 10 detects DC voltage Vb from battery B and outputs the detected DC voltage Vb to control device 30. Voltage sensor 13 detects voltage Vm across capacitor C2 and outputs the detected voltage Vm to control device 30. Further, current sensor 24 detects motor current MCRT1 flowing into motor generator MG1 for output to control device 30, and current sensor 28 detects motor current MCRT2 flowing into motor generator MG2 for output to control device 30. Control device 30 receives torque control values TR1, TR2 and motor rotation numbers MR1, MR2 from the external ECU.

Then, control device 30 generates signal PWMI1 in the manner described above in accordance with voltage Vm, motor current MCRT1, and torque control value TR1, and outputs the generated signal PWMI1 to inverter 14. Further, control device 30 generates signal PWMI2 in the manner described above in accordance with voltage Vm, motor current MCRT2, and torque control value TR2, and outputs the generated signal PWMI2 to inverter 31. Furthermore, when inverter 14 (or 31) drives motor generator MG1 (or MG2), control device 30 calculates the upper limit value of the duty ratio DR_Ulim according to output voltage Vm in the manner described above, in accordance with DC voltage Vb, voltage Vm, torque control value TR1 (or TR2), and motor rotation number MRN1 (or MRN2), and determines duty ratio DR for providing switching control to NPN transistors Q1 and Q2 in the range lower than the calculated upper limit value of the duty ratio DR_Ulim, to generate signal PWMC for providing switching control to NPN transistors Q1 and Q2 of up-converter 12. Then, control device 30 outputs the generated signal PWMC to up-converter 12.

In response to signal PWMC, up-converter 12 up-converts DC voltage Vb from battery B such that no overvoltage is applied to battery B, and supplies the up-converted DC voltage to capacitor C2. Capacitor C2 smoothes the DC voltage from up-converter 12, and supplies the smoothed DC voltage to inverters 14 and 31 via nodes N1 and N2. Then, inverter 14 converts the DC voltage smoothed by capacitor C2 into an AC voltage by signal PWMI1 from control device 30, to drive motor generator MG1. Inverter 31 converts the DC voltage smoothed by capacitor C2 into an AC voltage by signal PWMI2 from control device 30, to drive motor generator MG2. Thus, motor generator MG1 generates a torque designated by torque control value TR1, and motor generator MG2 generates a torque designated by torque control value TR2.

In motor driver 100, when output voltage Vm of up-converter 12 is lower than the target voltage (Vdc_com), power is taken from battery B to the side of inverters 14 and 31. In that case, duty ratio DR may be determined in such a manner that the current flowing between battery B and up-converter 12 is within a range of an optimal current in which the output from battery B becomes maximum, and is lower than the upper limit value of the duty ratio DR_Ulim described above, and the determined duty ratio DR may be used to provide switching control to NPN transistors Q1 and Q2.

In this manner, maximum output can be obtained from battery B even when the power required by motor generators MG1 and MG2 cannot be fully covered by the output of battery B, enabling DC voltage Vb to be converted into output voltage Vm such that no overvoltage is applied to battery B, while minimizing a voltage drop in capacitor C2.

Further, in the above description, duty ratio DR for providing switching control to NPN transistors Q1 and Q2 is determined in the range lower than the upper limit value of the duty ratio DR_Ulim, with or without the fluctuation of output voltage Vm from the target voltage (Vdc_com). The present invention is not limited to this, and duty ratio DR for providing switching control to NPN transistors Q1 and Q2 may also be determined in the range lower than the upper limit value of the duty ratio DR_Ulim described above when output voltage Vm fluctuates from the target voltage by a predetermined value or more.

Since an overvoltage is more likely to be applied to battery B when output voltage Vm significantly fluctuates from the target voltage and duty ratio DR must be significantly changed to set the fluctuated output voltage Vm at the target voltage to provide switching control to NPN transistors Q1 and Q2, it is effective to determine duty ratio DR in the range lower than the upper limit value of the duty ratio DR_Ulim when output voltage Vm fluctuates from the target voltage by a predetermined value or more.

It is to be noted than up-converter 12 and converter control means 303 constitute a "voltage conversion device".

Further, converter control means 303 constitutes a "control device" providing switching control to first and second switching elements (NPN transistors Q1 and Q2) using a duty ratio in a range lower than the upper limit value of the duty ratio DR_Ulim when an overvoltage is applied to a power supply (battery B).

Duty ratio converting unit 54 constitutes "duty ratio calculating means" calculating the upper limit value of the duty ratio DR_Ulim in accordance with threshold voltage OVb and output voltage Vm when an overvoltage is determined to have been applied to the power supply (battery B).

Inverter input voltage command calculation unit 50, feedback voltage command calculation unit 52, and duty ratio converting unit 54 constitute "switching control means" providing switching control to the first and the second switching elements (NPN transistors Q1 and Q2) using the duty ratio in the range lower than the calculated upper limit value of the duty ratio DR_Ulim.

Although the present invention has been described and illustrated in detail, it is clearly understood that the same is by way of illustration and example. only and is not to be taken by way of limitation, the spirit and scope of the present invention being limited only by the terms of the appended claims.

INDUSTRIAL APPLICABILITY

The present invention is applied to a voltage conversion device converting a voltage such that no overvoltage is applied to a power supply.

The invention claimed is:

1. A voltage conversion device, comprising:
   a voltage converter converting a power supply voltage from a power supply into an output voltage such that said output voltage attains a target voltage, through a switching operation between a first switching element as an upper arm and a second switching element as a lower arm; and
   a control device setting an upper limit value of a duty ratio based on an overvoltage that is applied to said power supply when said electric power returns back to said power supply resulting from a deviation of said output voltage from said target value and providing switching control to said first and said second switching elements using a duty ratio in a range lower than the upper limit value of the duty ratio.

2. The voltage conversion device according to claim 1, wherein said control device includes
   duty ratio calculating means calculating said upper limit value of the duty ratio in accordance with said output voltage and a threshold voltage, wherein the threshold voltage is a reference value for determining whether an overvoltage has been applied to said power supply, and
   switching control means providing switching control to said first and said. second switching elements using the duty ratio in the range lower than said calculated upper limit value of the duty ratio.

3. The voltage conversion device according to claim 2, wherein said output voltage is supplied to an inverter driving a motor.

4. The voltage conversion device according to claim 2, wherein said output voltage is supplied to a plurality of inverters provided corresponding to a plurality of motors and connected in parallel with each other.

5. The voltage conversion device according to claim 4, wherein said power supply voltage is obtained from a direct current battery.

* * * * *